United States Patent [19]

Kita

[11] Patent Number: 5,033,106
[45] Date of Patent: Jul. 16, 1991

[54] INFORMATION REGISTERING AND RETRIEVAL SYSTEM

[75] Inventor: Sumio Kita, Nara, Japan

[73] Assignee: Sharp Kabushiki Kaisha, Osaka, Japan

[21] Appl. No.: 439,016

[22] Filed: Nov. 20, 1989

Related U.S. Application Data

[63] Continuation of Ser. No. 112,886, Oct. 27, 1987, abandoned.

[30] Foreign Application Priority Data

Oct. 27, 1986 [JP] Japan .................................. 61-256073

[51] Int. Cl.$^5$ .............................................. G06K 9/36
[52] U.S. Cl. .......................................... 382/56; 382/41; 358/134; 358/426
[58] Field of Search ..................... 382/56, 41; 358/138, 358/261.3, 474, 494, 497, 133, 134

[56] References Cited

U.S. PATENT DOCUMENTS

| | | | |
|---|---|---|---|
| 4,589,144 | 5/1986 | Namba | 382/61 |
| 4,602,333 | 7/1986 | Komori | 382/56 |
| 4,668,985 | 5/1987 | Kurashige et al. | 358/134 |
| 4,672,444 | 6/1987 | Bergen et al. | 358/133 |
| 4,684,997 | 8/1987 | Romeo et al. | 358/263 |
| 4,809,350 | 2/1989 | Shimoni et al. | 382/56 |

Primary Examiner—David K. Moore
Assistant Examiner—Yon Jung

[57] ABSTRACT

An image registering and retrieval system includes a plurality of first memories for storing a plurality of blocks of image information, a plurality of second memories for storing compressed data from the plurality of blocks of the image information, a plurality of compressing and restoring sections that are provided for each block of the image information so that the image information is compressed or the compressed data is restored and a display device for displaying the image information. The plurality of compressing and restoring sections simultaneously process the image information.

5 Claims, 2 Drawing Sheets

INFORMATION REGISTERING AND RETRIEVAL SYSTEM

This application is a continuation of application Ser. No. 07/112,886 filed on Oct. 27, 1987, now abandoned.

BACKGROUND OF THE INVENTION

The embodiments of the present invention relate to an information registering and retrieval system which manages documents and drawings by converting image information to image signals.

Recently, electronic files have been put to practical use in order to manage documents and drawings that are increasing in the volume.

The electronic file converts the information on a document to image signals. The image information (hereinafter referred to as primary data) is registered together with retrieval information (hereinafter referred to as secondary data) for use in retrieving the primary data so that the desired primary data can be retrieved by the secondary data.

The conventional electronic file contains only one compressing and restoring device in a control circuit. Thereby, the entire image information to be retrieved is restored gradually by the compressing and restoring device.

In actual operation, however, it is often difficult to retrieve desired primary data by the secondary data alone. In many cases, it is necessary to display primary data to determine if it is the required information. As there is only one compressing and restoring device available, a long time is required for displaying the entire primary data. Consequently, the conventional electronic file requires complicated operation procedures, and a low operation efficiency results.

SUMMARY OF THE INVENTION

In view of the above, the object of the embodiments of the present invention is to provide an information registering and retrieval system of quick image processing capability. The system contains a plurality of compressing and restoring sections in a control circuit for faster information retrieval.

To achieve the above object, an information registering and retrieval system in an embodiment of the present invention includes a plurality of first memories for storing divided blocks of image information; a plurality of second memories for storing compressed data for the divided block of image information; a plurality of compressing and restoring sections provided for the divided blocks of image information for compressing the image information or restoring the compressed data; and a display for displaying the image information.

According to the embodiments of the present invention, the information registering and retrieval system is capable of processing the divided blocks of the image information simultaneously by using the plurality of compressing and restoring sections. Also, the system is capable of displaying the image information on the display starting from the center of the image information.

As described above, the information registering and retrieval system of the present embodiments divides each image information into a plurality of blocks and processes the blocks simultaneously by using the plurality of compressing and restoring sections. Thereby, the image processing time can be reduced substantially.

In addition, the image information that is divided into a plurality of blocks is displayed from the center corresponding to a concentration of information. Therefore, it is possible to identify the information promptly and retrieve the desired image information quickly.

BRIEF DESCRIPTION OF THE DRAWINGS

The embodiments of the present invention will become more fully understood from the detailed description given hereinbelow and the accompanying drawings which are given by way of illustration only, and thus are not limitative of the present invention wherein.

DESCRIPTION OF THE PREFERRED EMBODIMENTS

Two embodiments of the present invention are described in detail below with reference to the attached drawings.

Figure 1:
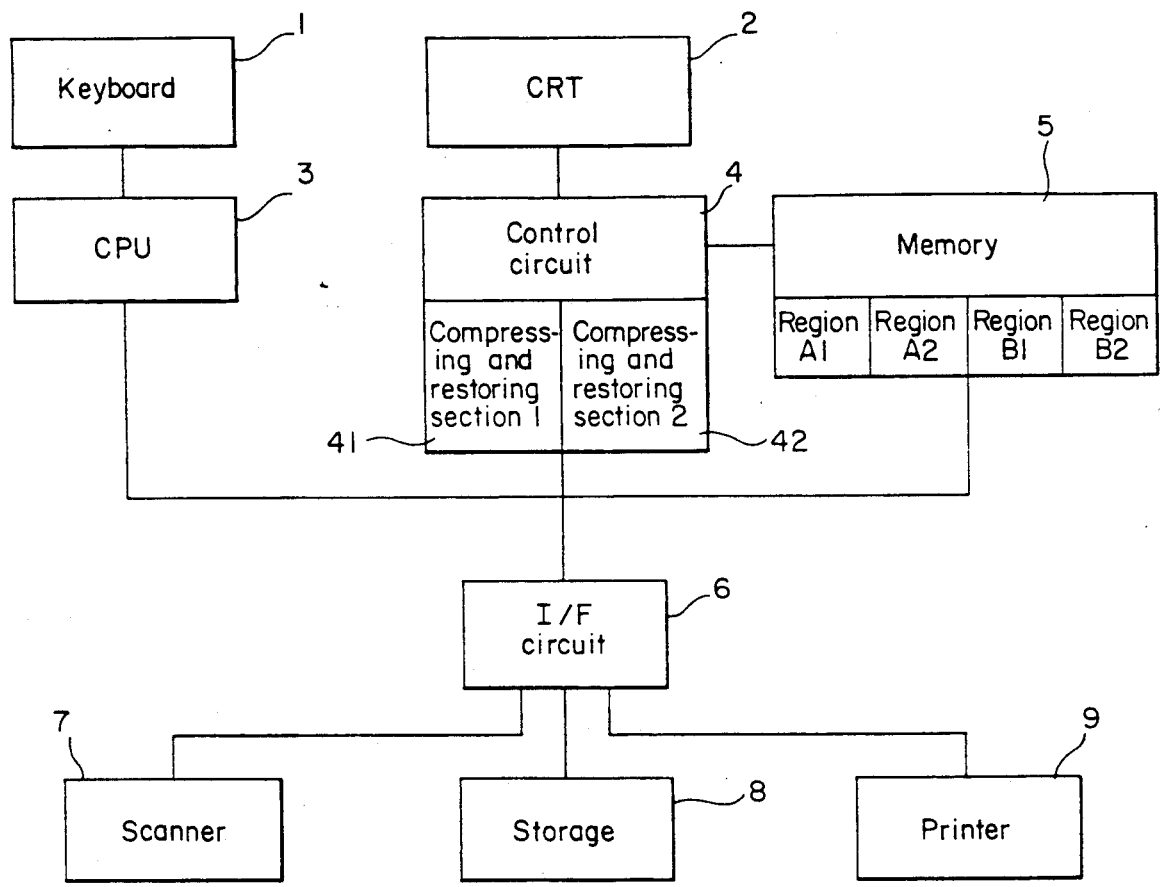
FIG. 1 is a block diagram showing the construction for the information registering and retrieval system of a first embodiment of the present invention.

FIG. 1 shows the construction of a first embodiment for the information registering and retrieval system of the present invention. An image information area is divided into two blocks as shown in FIG. 2 for processing by the registering and retrieval systems.

Referring to FIG. 1, a keyboard is provided for inputting various instructions and data, a CRT 2 displays primary data (image information) and secondary data (retrieval information), a CPU 3 controls the information registering and retrieval system of the present embodiment and a control circuit 4 is provided which controls information to be displayed. The control circuit 4 includes two compressing and restoring sections 41 and 42. 5 is a memory for storing information temporarily. The memory 5 comprises in the regions $A_1$ and $A_2$. An interface circuit 6 is provided, a read by a scanner 7 (described later) and two regions $B_1$ and $B_2$ for storing the compressed data of the image information stored in the regions $A_1$ and $A_2$. 6 is an interface circuit, 7 is the scanner for reading a document, 8 is a storage which stores primary and secondary data, and 9 is a printer.

The action of this embodiment of the invention is described in functions as follows.

Figure 2:
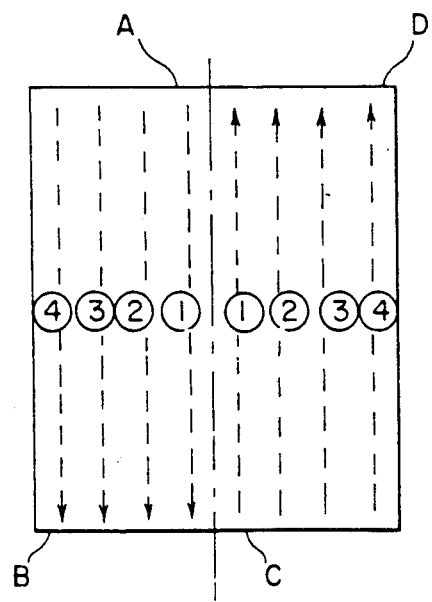
FIG. 2 shows an image information area that is divided into blocks for the information registering and retrieval system for the first embodiment of the present invention.

To register the image information shown in FIG. 2, the image information (in the left half) is read by the scanner 7 sequentially from B to A in the reverse direction of the arrows and the information is stored in the region $A_1$ of the memory 5 through the interface circuit 6. In succession, the image information (in the right half) is read sequentially from C to D along the arrows and the information is stored in the region $A_2$ of the memory 5 through the interface circuit 6. In short, the image information on a document is divided into two blocks, which are stored in the memory regions $A_1$ and $A_2$, respectively. At the same time, the image information is divided into two blocks and is displayed on the CRT 2.

Next, the compressing and restoring section 41 of the control circuit 4 compresses the image information that is stored in the memory region $A_1$, starting from A or the center of the image information to B sequentially along the allows as shown in FIG. 2. The control circuit 4 stores the compressed data in the region $B_1$ of the memory 5.

Simultaneously with the above process, the compressing and restoring section 42 of the control circuit 4 compresses the image information that is stored in the memory region $A_2$, starting from C or the center of the image information to D sequentially along the arrows as shown in FIG. 2. The control circuit 4 stores the compressed data in the region $B_2$ of the memory 5.

Upon completion of the above process, secondary data such as a title or a keyword is input through the keyboard 1 for adding to the image information stored in the memory 5. When a registration executing instruction is input, the image information having the secondary data affixed is stored in the storage 8 via the interface circuit 6. Thus, the registration of the image information is completed.

To retrieve a particular image information, a retrieval condition and a retrieval executing instruction are input through the keyboard 1. The CPU 3 reads the secondary data coinciding with the input retrieval condition and the primary data corresponding to the secondary data from the storage 8, and writes the primary data read out into regions $B_1$ and $B_2$ of the memory 5.

The compressing and restoring section 41 restores the compressed data that is stored in the memory region $B_1$, stores the restored image information in the region $A_1$ of the memory 5, and simultaneously displays the left half of the image information sequentially on the CRT 2, starting from A to B along the arrows as shown in FIG. 2.

Simultaneously with the above process, the compressing and restoring section 42 restores the compressed data that is stored in the memory region $B_2$, stores the restored image information in the memory region $A_2$ and displays the right half of the image information sequentially on the CRT 2, starting from C to D along the arrows as shown in FIG. 2.

As a result, the image information is displayed sequentially in two directions from the center.

Figure 4:
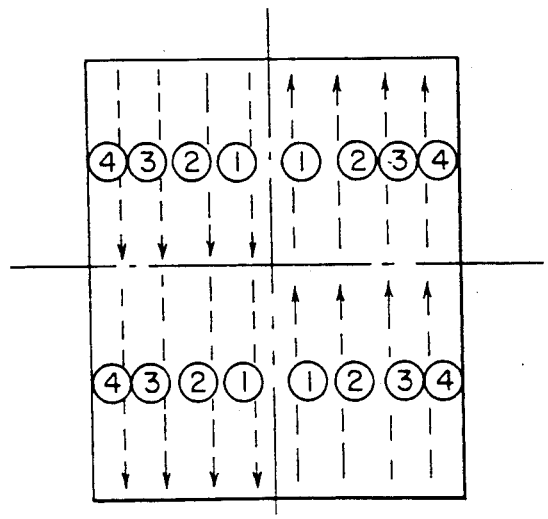
FIG. 4 shows an image information area divided into blocks for the second embodiment of the present invention.

A second embodiment of the information registering and retrieval system of the present invention divides the image information area into four blocks as shown in FIG. 4 and processes the information by four systems.

Figure 3:
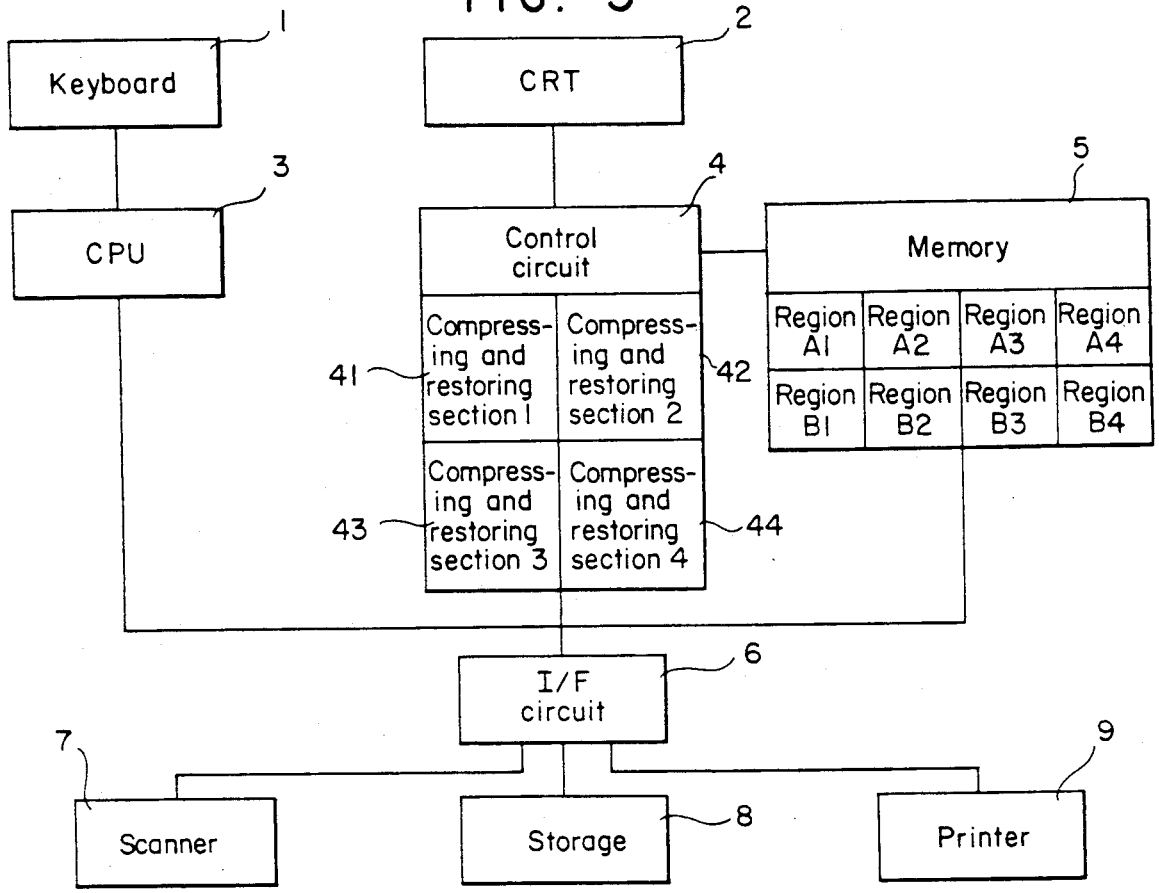
FIG. 3 is a block diagram showing the construction for a second embodiment of the present invention.

The construction of the second embodiment is shown in FIG. 3. The parts that are similar to the parts shown in FIG. 1 are allotted with the same reference numbers. The difference of the second embodiment from the first embodiment is that the control circuit 4 contains four compressing and restoring sections 41, 42, 43 and 44 and the memory 5 includes four regions $A_1$, $A_2$, $A_3$ and $A_4$ for storing image information read by the scanner 7 and four regions $B_1$, $B_2$, $B_3$ and $B_4$ for storing compressed data of the image information stored in the regions $A_1$, $A_2$, $A_3$ and $A_4$.

Furthermore, the first embodiment shown in FIG. 1, processes image information by two systems and is provided with two sets of the relevant components, whereas the second embodiment processes image information by four systems and therefore contains four sets of each of the relevant components.

The second embodiment functions as described in the following.

To register the image information that is shown in FIG. 4, the four blocks of the image information are read sequentially by the scanner 7 and the blocks are stored in the regions $A_1$, $A_2$, $A_3$ and $A_4$ of the memory 5, respectively. Simultaneously, the scanned image information is displayed on the CRT 2.

The compressing and restoring sections 41, 42, 43 and 44 of the control circuit 4 compress the respective blocks of image information that is stored in the memory regions $A_1$, $A_2$, $A_3$ and $A_4$ simultaneously, starting from the center of the image information along the arrows as shown in FIG. 4. The control circuit 4 stores the compressed data in the regions $B_1$, $B_2$, $B_3$ and $B_4$ of the memory 5, respectively.

Upon completion of the above process, a secondary data such as title or a keyword is input through the keyboard 1 and is added to the image information. By inputting the registration executing instruction, the image information having the secondary data affixed is stored in the storage 8 via the interface circuit 6. Thus, the registration of the image information is completed.

To retrieve particular image information, a retrieval executing instruction is input through the keyboard 1. Then, the primary data is read from the storage 8 and is written in the regions $B_1$, $B_2$, $B_3$ and $B_4$ of the memory 5.

The compressing and restoring sections 41, 42, 43 and 44 restore the compressed data in the memory regions $B_1$, $B_2$, $B_3$ and $B_4$, respectively, store the restored image information in the memory regions $A_1$, $A_2$, $A_3$ and $A_4$, and at the same time display the image information sequentially on the CRT 2, starting from the center of the image information along the arrows as shown in FIG. 4 (that is, each block of the image information is displayed sequentially along the arrows from the center to the side).

While only certain embodiments of the present invention have been described, it will be apparent to those skilled in the art that various changes and modifications may be made therein without departing from the spirit and scope of the present invention as claimed.

What is claimed is:

1. An image registering and retrieval system for converting a predetermined number of blocks of image information read from a document to image signals and registering or retrieving the image information, comprising:

memory means having the predetermined number of first memories for storing the predetermined number of blocks of image information and having the predetermined number of second memories corresponding to the predetermined number of first memories for storing compressed data of the predetermined number of blocks of image information;

control means, operatively communicative with said memory means, having the predetermined number of compressing and restoring means corresponding to the predetermined number of first and second memories for compressing and restoring the image information in the predetermined number of first and second memories in response to retrieval and executing instructions input to the system, a first half portion of the predetermined number of blocks of the image information being compressed and stored into the predetermined number of second memories in a first sequence direction from a central portion of the document and a second half portion of the predetermined number of blocks of the image information being compressed and stored into the predetermined number of second memories in a second sequence direction from said central portion of the document where said first sequence direction is opposite to said second sequence direction, said first and second half portions of the predetermined number of blocks of image information are restored into the predetermined number of first memories in said first and second sequence directions respectively; and display means, operatively communicative with said control means, for displaying the predetermined number of blocks of the image information simultaneous to and in said first and second sequence directions respectively as the image information is compressed and restored by the predetermined number of compressing and restoring means.

2. The information registering and retrieval system of claim 1, wherein the predetermined number of compressing and restoring means permit said the predetermined number of blocks of the image information to be displayed on said display means sequentially from said central portion of said display means.

3. An image registering and retrieval system for converting image information to image signals and displaying the image signals, comprising:

scanning means for sequentially reading a predetermined number of blocks of the image information from a document;

memory means having the predetermined number of first memory regions for storing the predetermined number of blocks of image information and the predetermined number of second memory regions for storing compressed image information corresponding to the predetermined number of first memory regions for storing compressed data of the predetermined number of blocks;

display means operatively communicative with said memory means, for sequentially displaying the predetermined number of blocks of image information simultaneous with storing the predetermined number of blocks in the predetermined number of first memory regions;

control means, operatively communicative with said memory means, having the predetermined number of compressing and restoring means corresponding to the predetermined number of first and second memory regions for compressing and storing the predetermined number of blocks, a first half portion of the predetermined number of blocks being compressed into the predetermined number of first compressed blocks and stored into the predetermined number of second memories in a first sequence direction from a central portion of the document and a second half portion of the predetermined number of blocks of the image information being compressed into the predetermined number of second compressed blocks and stored into the predetermined number of second memories in a second sequence direction from said central portion of the document where said first sequence direction is opposite to said second sequence direction the predetermined number of first and second compressed blocks of image information being restored into the predetermined number of first memories in said first and second sequence directions respectively;

storage means, operatively communicative with said control means, for storing the predetermined number of first and second compressed blocks in response to a registration executing command; and retrieving means, operatively communicative with said storage means, for retrieving desired blocks from the predetermined number of first and second compressed blocks in said storage means in response to a retrieval condition and executing instructions, the predetermined of compressing and restoring means storing said desired blocks in the predetermined number of second memory regions and said display means sequentially displaying said desired blocks simultaneous with storing said desired blocks.

4. A method for registering and retrieving image information read from a document in a system, comprising the steps of:

(a) dividing an image information area of the document into a predetermined number of blocks;

(b) successively reading the predetermined number of blocks by scanning means;

(c) storing block information for each of the predetermined number of blocks in the predetermined number of first memory regions of memory means;

(d) sequentially displaying said block information for the predetermined number of blocks on displaying means simultaneous with said step (c);

(e) compressing a first half portion of said block information into compressed information for the predetermined number of blocks in a first sequence direction from a central portion of the document;

(f) compressing a second half portion of said block information into compressed information for the predetermined number of blocks in a second sequence direction from said central portion of the document where said first sequence direction is opposite said second sequence direction;

(g) storing said first and second half portions compressed at said steps (e) and (f) in the predetermined number of second memory regions of said memory means in said first and second sequence directions respectively;

(h) storing said first and second half portions stored at said step (g) in storage means in response to inputting a registration executing instruction;

(i) retrieving said first and second half portions stored at said step (h) from said storage means in response to a retrieval condition and a retrieval executing instruction;

(j) storing said first and second half portions stored at said step (h) from said storage means in the predetermined number of second memory regions;

(k) restoring said first and second half portions stored at said step (j) from the predetermined number of second memory regions;

(l) storing block information corresponding to said first and second half portion stored at said step (j) in the predetermined number of first memory regions; and (m) sequentially displaying said block information on said display means simultaneous with said step (k).

5. The information registering and retrieval system of claim 1, wherein said control means compresses the predetermined number of blocks of said image information stored in the predetermined number of first memories, stores the predetermined number of blocks of said image information in the predetermined number of second memories in response to a registration executing instruction and restores the predetermined number of blocks of said image information compressed in the predetermined number of second memories in response to said retrieval and executing instructions.

* * * * *